(12) United States Patent
Don et al.

(10) Patent No.: US 7,409,883 B2
(45) Date of Patent: Aug. 12, 2008

(54) BALANCED POWER AXOID MECHANISM AND AXOID PRESS

(76) Inventors: Evgenny Alexeevich Don, 10-th Microdistrict 33/77, 720023 Bishkek (KG); Florid Borisovich Kim, 4-th Micordistrict 20-41, 720025 Bishkek (KG); Igor Vladimirovich Smarygin, UL Ashkabadskaya 53-2, 720035 Bishkek (KG)

( * ) Notice: Subject to any disclaimer, the term of this patent is extended or adjusted under 35 U.S.C. 154(b) by 347 days.

(21) Appl. No.: 10/550,321

(22) PCT Filed: Mar. 24, 2003

(86) PCT No.: PCT/KG03/00001

§ 371 (c)(1),
(2), (4) Date: Sep. 22, 2005

(87) PCT Pub. No.: WO2004/085878

PCT Pub. Date: Oct. 7, 2004

(65) Prior Publication Data

US 2006/0196296 A1  Sep. 7, 2006

(51) Int. Cl.
*F16H 21/16* (2006.01)
(52) U.S. Cl. ............................... 74/25; 74/63; 425/352
(58) Field of Classification Search ........... 74/25, 74/63; 425/352–355
See application file for complete search history.

(56) References Cited

U.S. PATENT DOCUMENTS 4,077,267 A * 3/1978 Schottler ............... 74/25

(Continued)

FOREIGN PATENT DOCUMENTS

| EA | 000482 | 8/1999 |
|----|--------|--------|
| EP | 0 799 691 | 10/1997 |

OTHER PUBLICATIONS

Krainev, A. "Mechanics of Machinery." Fundamental Dictionary, Moscow, Mashinostroenie PH (2000) p. 204, Mold Locking, Diagram (b).

(Continued)

*Primary Examiner*—Yogendra N. Gupta
*Assistant Examiner*—Thu Khanh T. Nguyen
(74) *Attorney, Agent, or Firm*—Ladas & Parry LLP

(57) ABSTRACT

The inventive axoid mechanism and axoid press relate to mechanical engineering, to devices for converting power and speed parameters of linear motions and are based on power axoid mechanisms whose friction is eliminated by the substitution of a sliding motion with an axoid rolling and by the reciprocal balance of normal reaction components in bearing elements of the novel balanced power axoid mechanism. Said mechanism is embodied in the form of a closed system of axoid mechanisms comprising end elements which are linearly movable in the direction thereof. The axoid mechanisms are provided with support surfaces and an intermediate link consisting of contact elements provided with support surfaces and interacting with the support surfaces of the end elements in such a way that the displacement of one on the end elements ensures the mutual axoid rolling thereof devoid of sliding motion and associated with a force and motion transfer to the other end elements, said elements being integrated into one or several power circuits by means of multi-end elements. The invention also makes it possible to develop a drive which is based on said balanced power axoid mechanism and used for actuating units, in particular a drive for axoid presses which, in comparison with traditional power mechanisms, are provided with an increased service life, pressing power parameters and have a reduced friction, wear and costs for the lubrication, cooling and repair thereof.

10 Claims, 5 Drawing Sheets

U.S. PATENT DOCUMENTS 4,191,059 A * 3/1980 Vanslette .................... 74/25
4,198,846 A * 4/1980 Wrona ........................ 74/25
6,142,029 A    11/2000 Don et al.
6,308,586 B1 * 10/2001 Berger ....................... 74/63

OTHER PUBLICATIONS

Krainev, A. "Mechanics of Machinery." Fundamental Dictionary, Moscow, Mashinostroenie PH (2000) p. 267, Mold Locking, Diagrams (a), (e).

* cited by examiner a.

b.

BALANCED POWER AXOID MECHANISM AND AXOID PRESS

TECHNICAL FIELD

This invention relates to mechanical engineering and has particular reference to mechanisms for converting of forces and motions, namely, to power axoid mechanisms and equipment involving power-driven actuators, based on power axoid mechanisms, in particular, presses.

BACKGROUND ART

Known in the present state of the art is a power axoid mechanism (hereinafter referred to as PAM) as claimed in Eurasian Pat. #000482, comprising end elements linearly displaceable each in its own direction and having support surfaces. The mechanism is provided with an intermediate link consisting of contact elements provided with support surfaces adapted to interact with those of the end elements in such a manner that when one of said end elements is being displaced, the rest of the end elements perform positive involving mutual axoid rolling motion so as to impart forces and motion to another end element. In such a mechanism friction between the end elements is eliminated as a result of substituting sliding motion of the end elements by axoid rolling motion of the supporting surfaces thereof, whereby said mechanism may be manufactured from such materials that tolerate high contact stresses. Accordingly, such mechanisms are featured by power characteristics many times those of articulated linkage having a similar kinematic structure.

However, the effective forces applied to the guide-ways of the PAM end elements and to the mating components thereof, cause considerable friction resulting in premature wear thereon and loss of power. Reduced friction on the PAM guide-ways is attainable by eliminating or decreasing the normal components of reaction forces acting upon the guide-ways of the end elements thereof, due to the provision of conditions for mutually balancing said reaction forces.

Said method for reducing friction in the PAM opens wide prospects for synthesis of new and more efficient balanced power axoid mechanisms operating without any perceptible friction in the guide-ways.

Power actuator mechanisms (drives) of processing equipment make use of diverse mechanical mechanisms which generate high forces, e.g., linkage actuators and slide r-crank mechanisms which is the case with a majority of presses having articulated joints and slide-ways.

Substitution of said traditional power actuators by PAM-based drives featuring reduced friction and higher performance reliability enables one to carry out further upgrading of power equipment, in particular, that of presses.

SUMMARY OF THE INVENTION

It is a primary and essential object of the present invention to develop novel power axoid mechanisms termed "balanced power axoid mechanisms" (hereinafter referred to as BPAM for the sake of brevity), wherein friction on the end elements thereof and the number of the guide-ways are reduced by mutually balancing the forces applied thereto. Various modifications and versions of BPAM can find widespread practical use in processing equipment, e.g., in press power equipment involving application of high forces of pressure.

Balancing of pressure forces in the BPAM and a corresponding reduction of friction on the guide-ways of the end elements and occasionally dispensing with said guide-ways is attainable due to integrating the end elements of at least two PAM units made according to Eurasian Pat. #000482 into an element novel as to the functional purpose thereof, called a multi-end element capable of so balancing the forces of pressure that the normal component of a total force exertion produced by the multi-end element upon a corresponding way would approximate zero or be equal thereto. That is why a simplest BPAM appears as a double-link mechanism consisting of at least two PAM units, wherein two end elements are integrated into one driving multi-end element whose at least one outermost end element is a driven one and which is adapted to contact, either movably or rigidly, the working member, and the other end element is connected to the support element. A second embodiment of such a BPAM differs from the first one in that two outermost end elements thereof are driven ones and are connected to the elements of the working members. There is a third embodiment of said BPAM, wherein one or two outermost end elements are adapted to take up driving forces and are essentially the driving ones, while the central end elements form the driven multi-end element. In all the cases mentioned before, two links of said BPAM makes up, together with stationary and movable support elements which may be, e.g., the components of the bed-plate or those of the working members of the equipment, a power circuit adapted to balance the action and reaction forces on one multi-end element.

In the case of a closed power circuit the whole of the BPAM multi-end elements balance the forces of at least four power-train members, each in turn comprises one or more PAM units. In this case, the power-train members of the BPAM establish one or more closed circuits, in each of which the multi-end elements are adapted to balance the action forces, to provide for separate or conjoint drive of the driving multi-end elements of each power-train member, receiving and transmitting the action forces and performing necessary displacements by the driven multi-end elements connected to the elements of other mechanisms or to actuators. In cases where power-train members of a BPAM form two or more power-train circuits, there appear intermediate multi-end elements common to said power circuits in the zones of contact therebetween and being in fact the driven and driving ones in the respective power balancing circuits which get in contact with one another by virtue of said intermediate multi-end elements which do not interact immediately with the drive elements and with those of other actuating mechanisms.

Supporting multi-end elements provided in the BPAM are adapted to serve as stationary-fixed supports aimed at compensating for the forces developed by the power-train members and driven multi-end elements of the respective power circuits; as a rule, said supporting multi-end elements are to lock the power circuit of the power members to the housing of the equipment involved. Driving, driven and intermediate multi-end elements may perform the function of movable supports in the BPAM and also serve as additional supporting multi-end elements when their travel is limited by guide-ways.

Symmetrical arrangement of the BPAM power circuits with respect to at least one plane provides for favorable conditions for completely balancing harmful components of the forces applied to the multi-end elements. This in turn enables one to eliminate friction arising in the BPAM and in some guide-ways with the proviso that the driving and driven multi-end elements perform correlated motion. Hence multi-end elements of the PAM area adapted to balance the action forces inside a respective power circuit of the power-train members while symmetrical arrangement of the power circuits provides a possibility for elimination of friction and dispensing with some guide elements, whereby the BPAM differs fundamentally from the PAM and wherein novelty and practical applicability of the present invention reside.

Power-train members of a BPAM may make up two or more closed balanced power circuits, e.g., with a separate drive of the driving multi-end elements symmetrical with respect to one plane which comprises a geometric axis of the guide-way of at least one driving multi-end element of the main power circuit which receives motion and/or forces from the drive. Said forces may be imparted via the power-train members, to at least one intermediate and one driven multi-end element which contacts the working member. The intermediate multi-end element which is in fact a driven element of the BPAM second power circuit is movable under the effect of forces applied thereto and to the supporting multi-end element, and of forces received by the power-train members from two driving multi-end elements which in turn take up said forces from another drive. Such being the case, the intermediate multi-end element may be movable independently of the first power circuit so as to perform the function of a movable supporting multi-end element whose position may be technologically preset in each particular case, and be fixed stationary.

One more embodiment of the BPAM is F, wherein forces are generated on the outermost driven multi-end element; to this end, the BPAM comprises at least one supporting multi-end element. With the BPAM comprising two tandem-arranged power circuits the driven multi-end element of the first power circuit may be in fact the driving multi-end element of the second power circuit, as well as the intermediate supporting multi-end element of the BPAM. When more than two power circuits are provided in the BPAM, the driven multi-end element of the second power circuit occurs to serve as the intermediate multi-end element of the third power circuit, and so on.

When the BPAM power-train members constitute a number of independent closed power circuits, they are as a rule disposed inside one or more supporting end elements adapted to take up the reaction forces of the power-train members thereof. Furthermore, the driving multi-end elements of each independent power circuit impart the forces and motions of their power-train members to a respective driven multi-end element which performs separate motion and imparts forces in the BPAM. It is a combination of forces and motions of the driven multi-end elements that enables the BPAM to perform, via the working members thereof, its principal technological function.

The BPAM as a system of driving, intermediate, driven and supporting multi-end elements and power-train members may have its own (independent) drive or that common to all the power circuits, and may also be symmetrical with respect to a number of planes, a feature that enables one to do away with guide-ways for certain multi-end elements whose motion path is provided in this case by the degrees of the BPAM motion.

One of the most preferred kinds of the BPAM units for force balancing is the one comprising four power-train members and four multi-end elements closed into a single power circuit symmetrical relative to two mutually square planes and devoid of intermediate multi-end elements, wherein a pair of driving multi-end elements is disposed symmetrically with respect to one plane of symmetry, while a pair of driven multi-end elements is arranged symmetrically to another plane of symmetry. In such a BPAM all components of the forces of the driving and driven multi-end elements, normal to the guide-ways are mutually balanced, and friction forces approximate zero. This enables one to dispense with some of the guide-ways on the multi-end elements, with the proviso that the remainder of the guide-ways provide for one-to-one relation of motions performed by the driven multi-end elements to those of the driving multi-end elements.

Whenever necessary, the area of motion of the driving end elements may be so limited that the area of motion of the geometric axes of their support surfaces be disposed from the middle behind the planes passing through the geometric axes of the respective support surfaces of the driven end elements, or between said respective planes, or else on both sides thereof.

The aforesaid versions of disposing the geometric axes of supporting surfaces of the driving end elements provide three possible embodiments of the BPAM which is also the subject matter of the present invention.

Power symmetry of each of the BPAM preferred embodiments is characterized by the fact that the driving and driven end elements thereof are acted upon by impressed forces which are pairwise equal in magnitude and directed oppositely. In this case, leaving friction forces out of account, relationship between the forces applied to the driven end element and those applied to the driving end element in the BPAM embodiments under discussion is expressed by the following formula:

$$P_2 = P_1 \operatorname{tg} \alpha \tag{1}$$

where $P_1$ is the force applied to the driving multi-end element; $P_2$ is the force applied to the driven multi-end element; $\alpha$ is the angle between the direction of the guide-way of the driving multi-end element and a line passing through geometric axes of the support surfaces of the respective driving and driven multi-end elements.

It is evident that when the magnitude of the angle $\alpha$ in the BPAM approximates 90° (i.e., when the geometric axes of the support surfaces of the driven multi-end elements are nearby the planes passing through the respective geometric axes of the support surfaces of the driven multi-end elements), a considerable increase in the ratio between the force applied to the driven multi-end element and the force applied to the driving multi-end element is attained. This feature renders said BPAM attractive for the powered drive of actuating members used in process equipment involving high working forces, such as presses. Such equipment can be subdivided into the following three groups:

1. Equipment featuring a relatively long working stroke of the operating member and relatively low operating force at the start of the working stroke but gradually increasing towards the end thereof; to such machinery may pertain those adapted to perform compacting the material under process, e.g., a press for molding articles from the material being compacted;

2. Equipment having a relatively short working stroke of the operating member and high operating force which is nearly constant throughout the entire working stroke; to such machinery may relate those for plastic working of metal articles involving small deformation thereof;

3. Equipment featured by relatively long working stroke of the operating member and large operating force which is nearly constant throughout the entire working stroke; to such machinery may relate a majority of presses made use of in metal working practice.

For all cases mentioned before it is not a complicated task to integrate a powered drive for process equipment, based on a highly space-saving BPAM having adequate dynamic and kinematic parameters. To this end, a prerequisite should be met according to which none of the points on the graphic chart representing the law of variation of the load applied to the operating member during its motion within a working stroke of the operating member should be situated higher than the respective point on the graphic chart representing the Formula (1).

A distinguishing feature of the third version mentioned before resides in a necessity to use BPAM units each provided with a number of power circuits capable of separately imparting forces and motions. Besides, one or more power circuits provide for motion of the main power circuit of the BPAM power-train members and fixing a relative position of said circuit which effects drive of the operating member. The power circuits of the BPAM power-train members may have either a separate or combined drive made on the basis of known devices of the same purpose.

The above problem may be solved due to appropriately displacing the PAM first power balancing circuit that imparts motion to the PAM main power circuit which establishes forces applied to the operating member, and fixes it stationary in position within the limits of deformation of the material under process. Said prerequisite can be met without any difficulty in case of an automatic powered drive starting mode.

Such being the case, once the working stroke of one operating cycle has been over, the BPAM main power circuit returns to the initial position. If in this case the material of the workpiece under processing is in the state of permanent set, a return stroke (idle run) of the BPAM main power circuit occurs without any force exertion upon the operating member on the part of the workpiece under processing. At that instant the driven supporting end element of the first power circuit is imparted motion, said element being capable of retaining a position assigned thereto when the working member assumes the initial position for a next force effect to exert on the material under processing, thereby making possible performing a next working stroke involving an appropriate force exerted within the limits of the working stroke performed by the PAM supporting power circuit. Control over the motion of said power circuit is effected in keeping the production process flow-sheet for the workpiece involved. That is why the BPAM may be applied practically as a driving actuator for process equipment featuring a long working stroke and high operating force developed.

Figure 4:
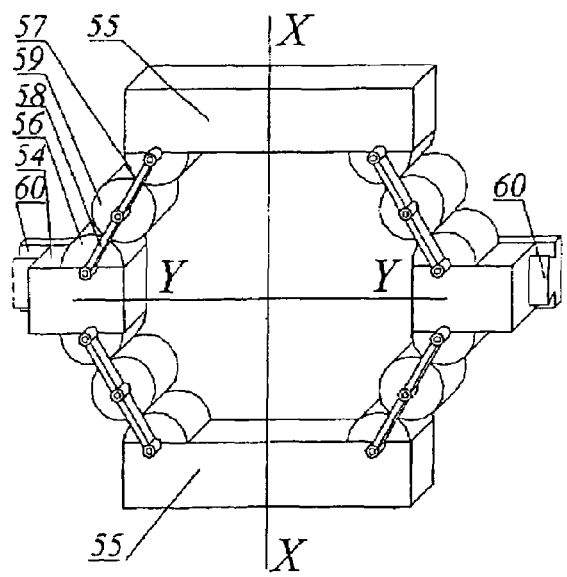
Figure 5:
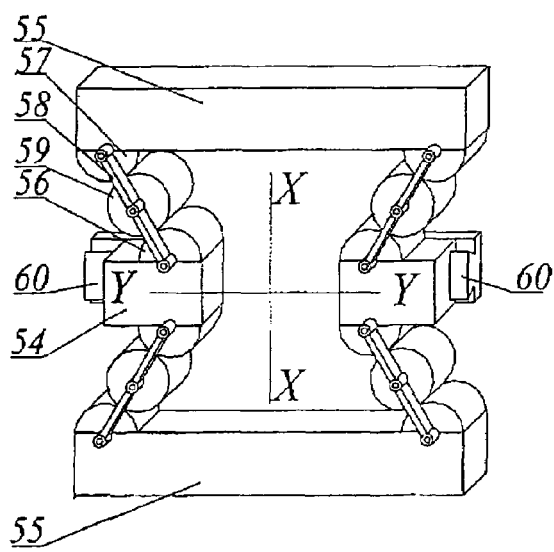
Figure 6:
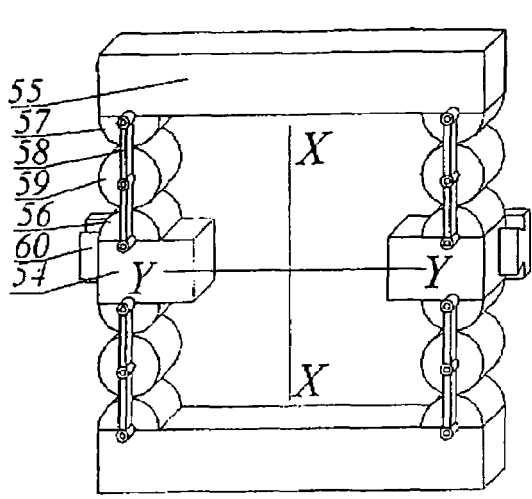
Figure 7:
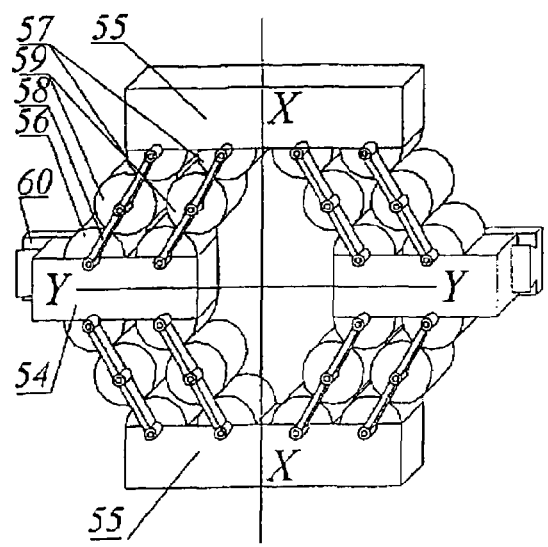
Figure 8:
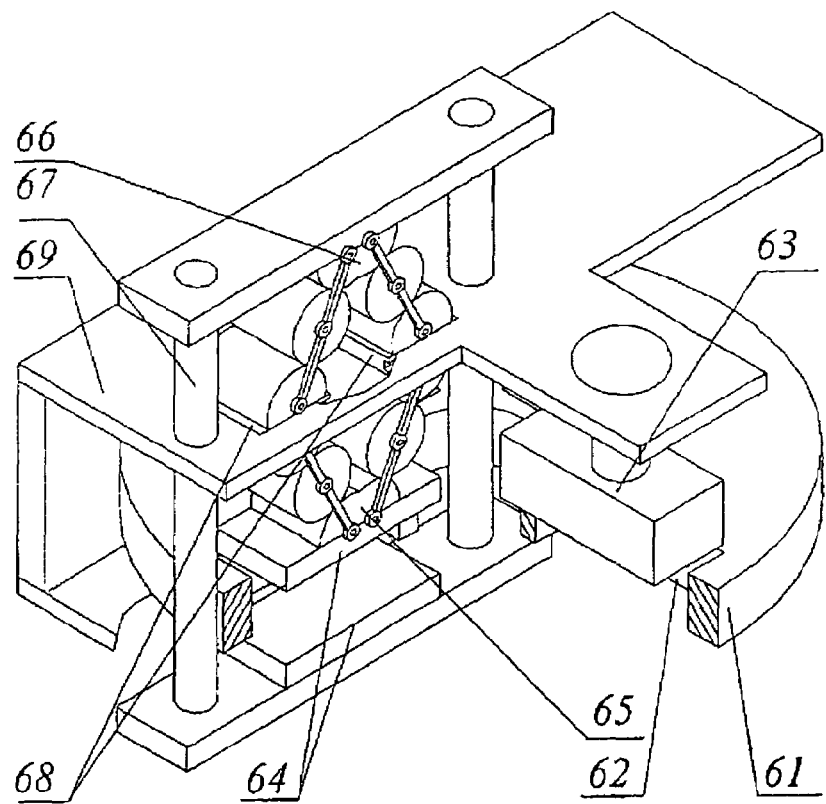
Figure 9:
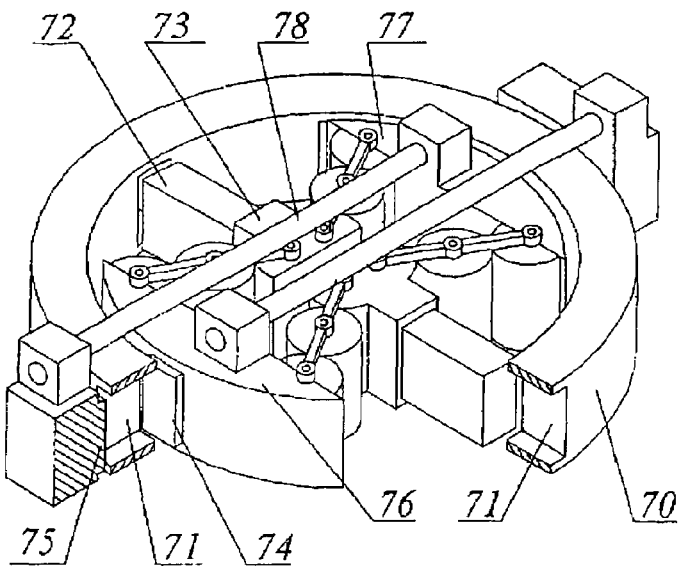
Figure 10:
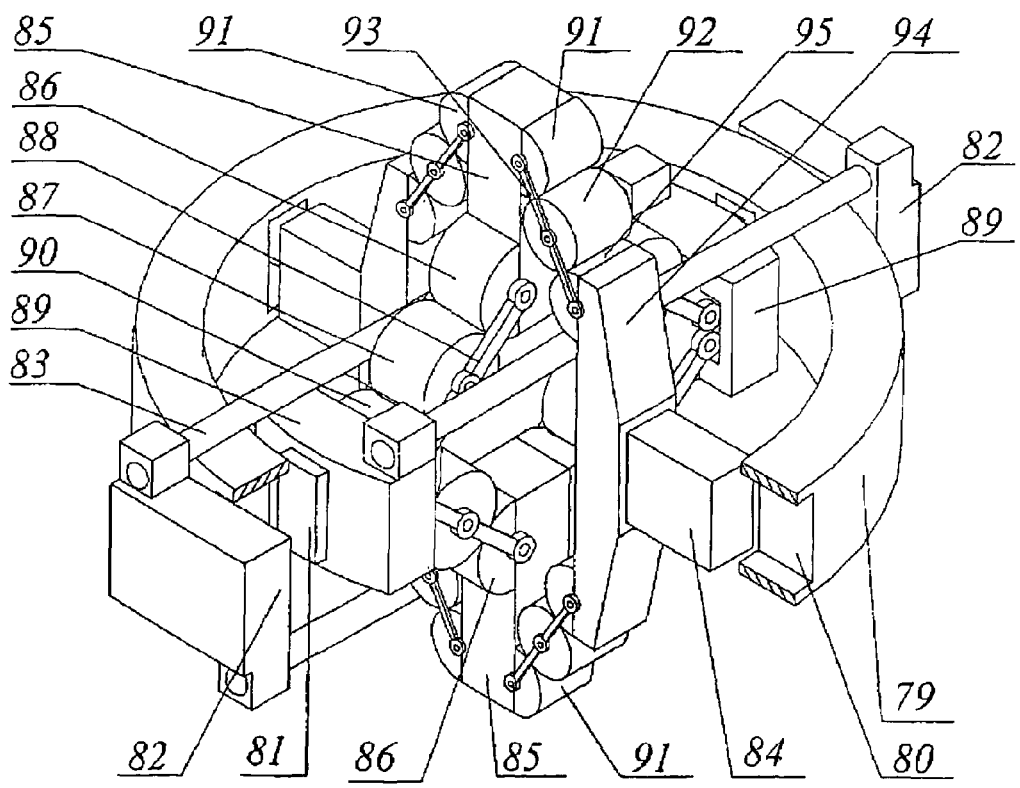
Figure 12:
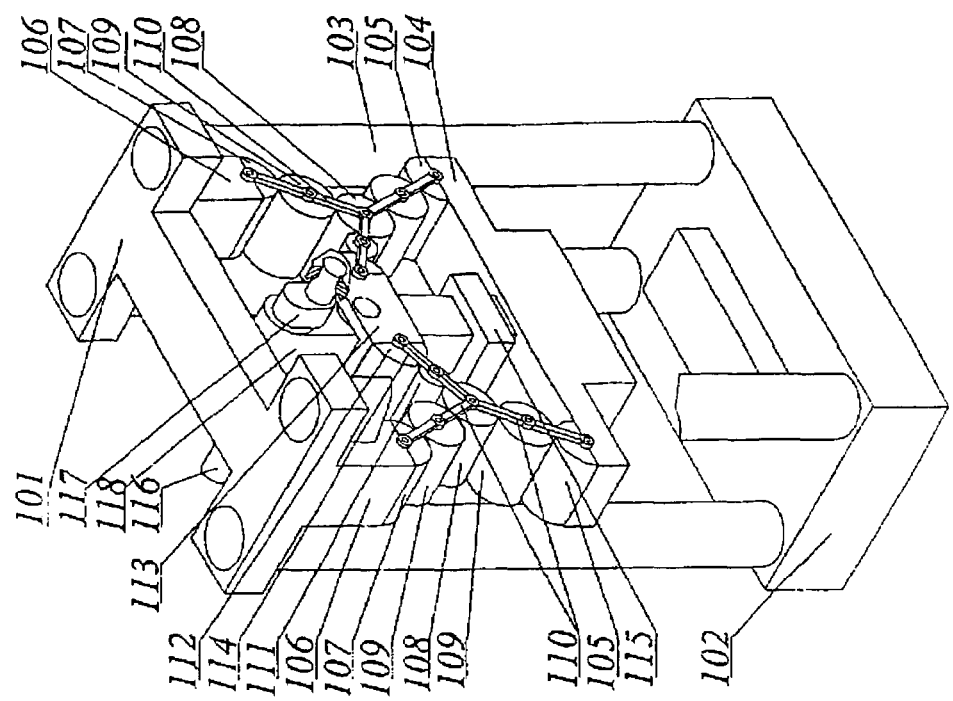
Figure 11:
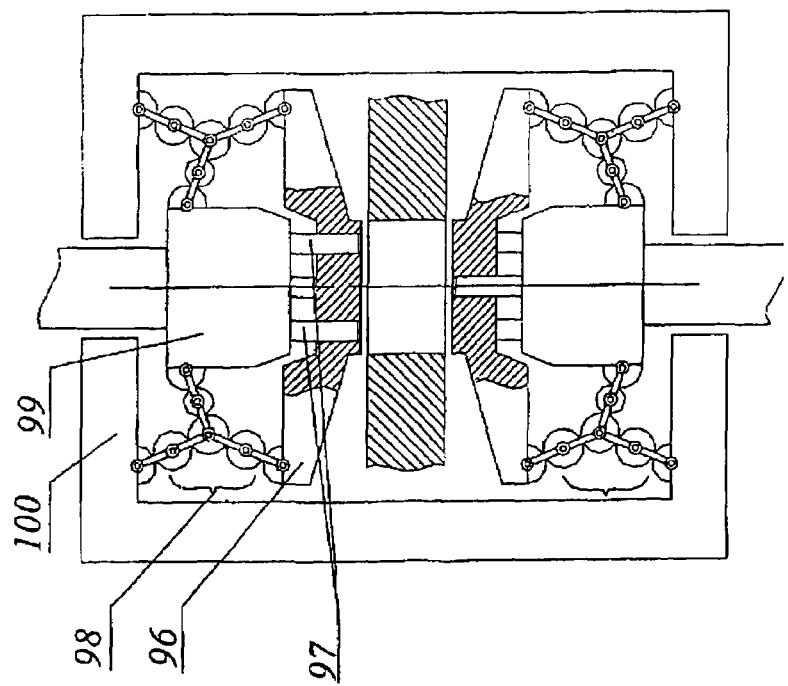

(a) with guide-ways for intermediate multi-end elements and two movable driven supporting end elements; and (b) with one supporting multi-end element, one driven end element and intermediate multi-end elements less guide-ways;

FIG. 4 is a first embodiment of the BPAM less intermediate multi-end elements while in the initial position (the same being an initial or final position of the BPAM according to a third embodiment thereof);

FIG. 5 is a second embodiment of the BPAM less intermediate multi-end elements while in the initial position (the same being a final or initial position of the BPAM according to a third embodiment thereof);

FIG. 6 is a view of the BPAM less intermediate multi-end elements while in a position where the geometric axes of the support surfaces of the driving multi-end elements are nearby the surfaces passing through the respective geometric axes of the support surfaces of the driven multi-end elements, said position being in fact a final position of a first and second BPAM embodiments or a middle position of a third embodiment thereof;

FIG. 7 is an BPAM embodiment less intermediate multi-end elements, wherein two combinations of the support surfaces are interposed between the driving and driven multi-end elements thereof;

FIG. 8 is an embodiment of an axoid press with a disk rotor for press-molding of articles from compactible materials, having a BPAM-based powered pressing drive according to FIG. 4;

FIG. 9 is an embodiment of an axoid press with a cylinder-shaped rotor for press-molding of articles from compactible materials, having a BPAM-based powered pressing drive according to FIG. 5;

FIG. 10 is an embodiment of an axoid press with a cylinder-shaped rotor for press-molding of articles from compactible materials, having a powered drive of operating members based on a common BPAM with two driving multi-end elements;

FIG. 11 is an embodiment of pressing mechanism punches with pins and pressing plates which may be used to equip any one of the presses as shown in FIGS. 8, 9 and 10; and FIG. 12 is an embodiment of an axoid press with a powered drive based on the physical-chemical characteristics of FIG. 3b.

PREFERRED EMBODIMENT OF THE INVENTION

Figure 1:
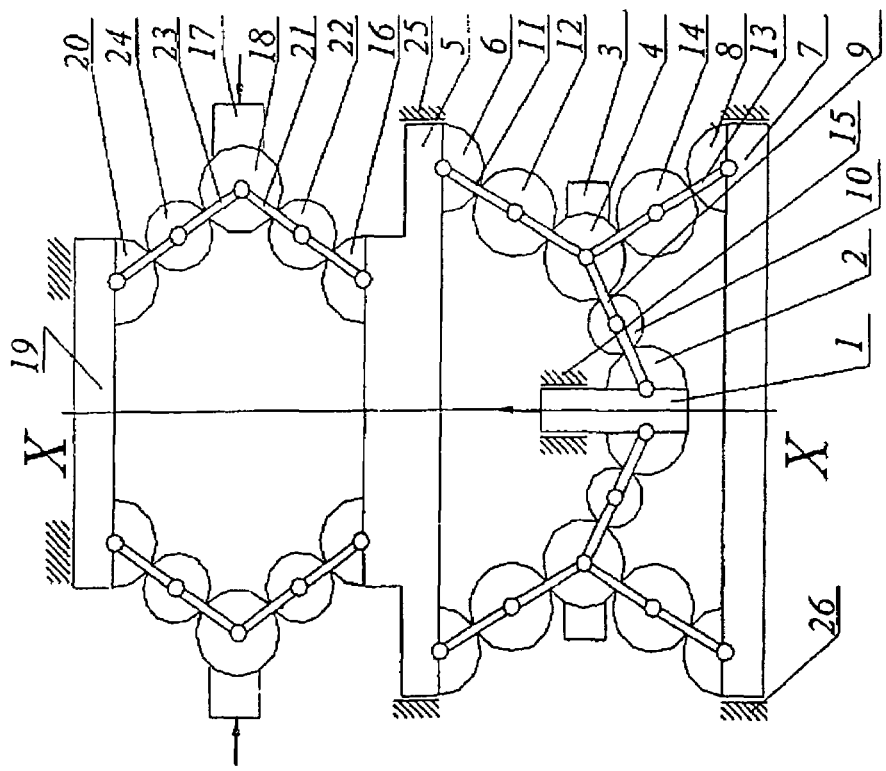
FIG. 1 is a diagram of the BPAM having tandem-mounted power circuits.

The balanced power axoid mechanism (BPAM) whose diagram is presented in FIG. 1 comprises two power circuits of which a first one consists of a driving multi-end element 1 provided with support surfaces 2, intermediate multi-end elements 3 provided with support surfaces 4, an intermediate multi-end element 5 which serves as the intermediate supporting element for the entire BPAM and is provided with support surfaces 6, a driven supporting end element 7 provided with support surfaces 8, power-train members each comprising retainer elements 9 which hold in place intermediate members 10 and the support surfaces 2 and 4 while interacting therewith, power-train members each comprising retainer elements 11 which hold in place intermediate members 12 and the support surfaces 4 and 6 while interacting therewith, which the support surfaces 4 and 6, and power-train members each comprising retainer elements 13 which hold in place intermediate members 14 and the support surfaces 8 and 4 while interacting therewith. Practicable motions of the driving multi-end element 1 are defined by stationary-fixed guide-ways 15. A second power circuit comprises the intermediate multi-end element 5 provided with support surfaces 16, driving multi-end elements 17 provided with support surfaces 18, a supporting end element 19 provided with support surfaces 20, power-train members each comprising retainer elements 21 which hold in place intermediate members 22 and the support surfaces 16 and 18 while interacting therewith, and power-train members each comprising retainer elements 23 which hold in place intermediate members 24 and support surfaces 18 and 20 while interacting therewith. Motions of the driving multi-end element 5 which are likely to occur are defined by stationary fixed guide-ways 25 and those of the driven multi-end element 7, by guide-ways 26. In view of the BPAM symmetry relative to the plane X-X of symmetry, the reference numerals are provided only on one half of the picture.

Figure 2:
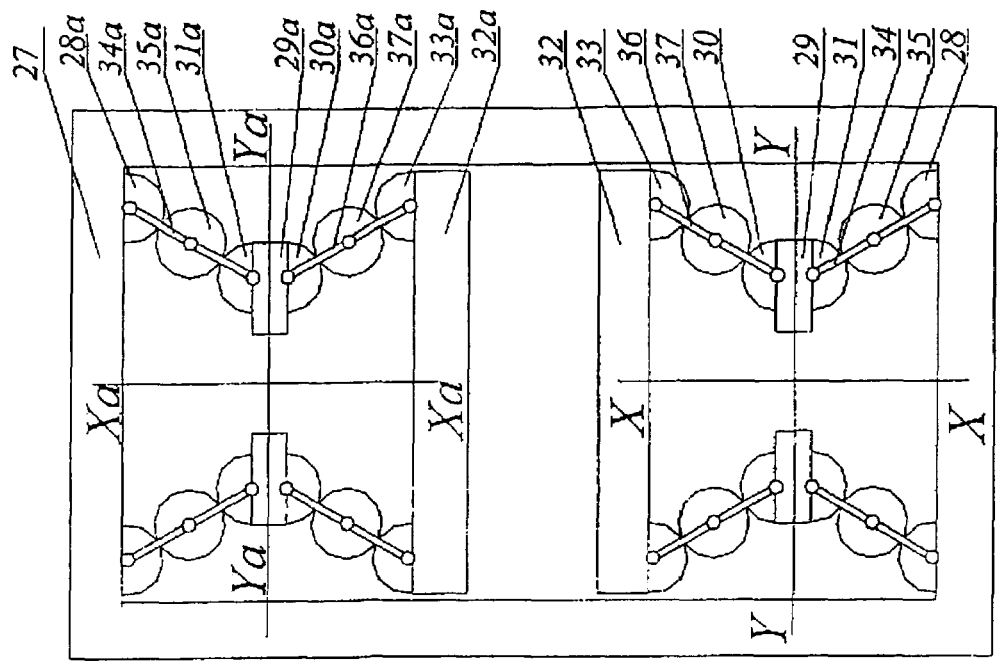
FIG. 2 is a diagram of the BPAM embodiment having two independent power circuits and the supporting end element appearing as a frame.

A double-circuit BPAM having a multi-end element thereof shaped as a frame shown in FIG. 2 is composed of two closed power circuits of any configuration, e.g., of those interconnected by a supporting multi-end element 27 appearing as a frame-configuration housing and provided with support surfaces 28 and 28a. For the sake of convenience, similar elements of one of the power circuits are denoted by numerals less a letter index and those of the other power circuit, by those followed by the index 'a'. Each of the BPAM's power circuits comprises, apart from a power-train member 27, also driving multi-end elements 29 and 29a provided with support surfaces 30 and 31, 30a and 31a, a driven multi-end element 32, 32a provided with support surfaces 33, 33a, power-train members each comprising retainer elements 34, 34a which hold in place intermediate members 35, 35a and support surfaces 28, 28a and 31, 31a while interacting therewith, and power-train members each comprising retainer elements 36, 36a which hold in place intermediate members 37, 37a and support surfaces 30, 30a and 33, 33a while interacting therewith. Each of said circuits is symmetrical relative to two mutually square surfaces X-X and Y-Y and may define the motion path of the driving multi-end elements 29, 29a and of the driven multi-end element 32, 32a and less guide-ways with which the supporting end element 27, 27a may be equipped, whenever necessity arises to eliminate the effect of random factors tending to distort said motion paths.

Figure 3:
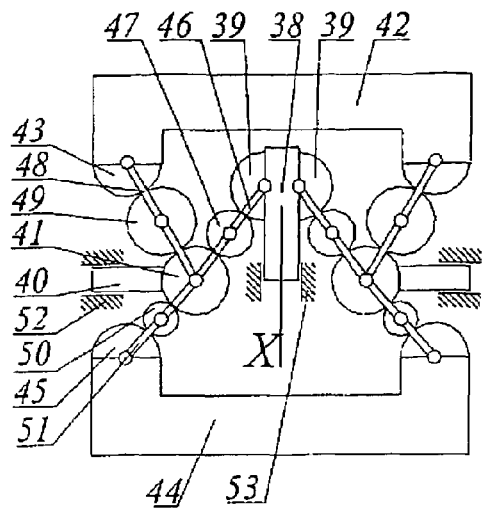
FIG. 3 is a diagram of the BPAM with a driving, intermediate and driven multi-end elements in two versions.
Figure 3:
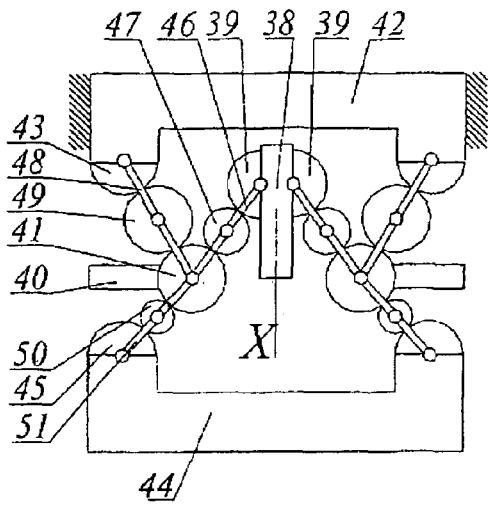

The BPAM the diagram of which presents in FIG. 3 in two versions, comprises the driving multi-end element 38 provided with support surfaces 39, intermediate multi-end elements 40 provided with support surfaces 41, a driven multi-end element 42 provided with support surfaces 43, a driven multi-end element 44 provided with support surfaces 45, power-train members each comprising retainer elements 46 which hold in place intermediate members 47 and support surfaces 39 and 41 while interacting therewith, power-train members each comprising retainer elements 48 which hold in place intermediate members 49 and support surfaces 41 and 43 while interacting therewith, and power-train members each comprising retainer elements 50 which hold in place intermediate members 51 and the support surfaces 41 and 45 while interacting therewith. Versions 'a' and 'b' differs from each other in that according to the latter one, the multi-end element 42 is in effect a supporting multi-end element, as well as in the necessary guide-ways which define practicable motions of the multi-end elements thereof.

According to the version 'a', the intermediate multi-end elements 40 are in fact movable supporting multi-end elements whose practicable motions are defined by stationary fixed guide-ways 52, practicable motions of the driving multi-end element 38 are defined by stationary fixed guide-ways 53 and to provide practicable motions of the driven multi-end elements 42 and 44 use of guide-ways is optional.

According to the version 'b', the supporting multi-end element 42 is fixed stationary and to provide practicable motions of the remainder multi-end elements use of guide-ways is optional.

According to a preferred embodiment of a BPAM less intermediate multi-end elements (FIGS. 4-7), said BPAM comprises driving supporting multi-end elements 54 and driven multi-end elements 55 linearly movable symmetrically relative to the respective planes X-X and Y-Y of symmetry. Driving supporting multi-end elements 54 are equipped with cylinder-shaped support surfaces 56 and driven multi-end elements 55, with cylinder-shaped support surfaces 57. Intermediate members 59 are so fixed in place between the support surfaces 56, 57 and retainer elements 58 while interacting therewith that the geometric axes of the interacting support surfaces 56, 57 and of the intermediate members 59 lie in the same plane. The driving supporting multi-end elements 54 are associated with a drive (not shown purposely) of any heretofore known construction adapted to provide their symmetrical motions.

The BPAM units may be classified into the following principal versions proceeding from the size of the driven multi-end elements 55 and particular layout features of the machinery wherein said BPAM units may be made use of:

(a) the version whose initial position is shown in FIG. 4 and the final position, in FIG. 6;

(b) the version whose initial position is shown in FIG. 5 and the final position, in FIG. 6; and (c) the version whose initial and final positions are shown in FIGS. 4 and 5, respectively, and the mid-position between the initial and final ones, in FIG. 6. The load-bearing capacity of the BPAM can be increased by parallel arrangement, between the appropriate driving and driven multi-end elements, of more than one combination of the supporting surfaces 56, 57, the intermediate members 59 and the retainer element 58, e.g., as shown in FIG. 7.

When practicable motions of the driving supporting multi-end element 54 of the BPAM according to any one of the versions mentioned before are defined by by stationary fixed guide-ways 60, then practicable motions performed by the driven multi-end elements may be defined also less any guide-ways, only due to the degrees of freedom inherent in the BPAM. The axoid press version shown in FIG. 8 comprises a disk rotor 61 accommodating press-molds 62, a loading mechanism (not shown), a squeezing mechanism 63 and a pressing mechanism which comprises press punches 64 one of which is in immediate connection with a driven multi-end element 65 of the BPAM, and the other, with a driven BPAM 66 via tie-rods 67. Driving supporting multi-end elements 68 of the BPAM are disposed in the guide-ways of a framework 69. For fear that comprehension of the axoid press construction arrangement be too difficult, the BPAM drive is not shown.

The version of an axoid press shown in FIG. 9 comprises a cylinder-shaped rotor 70 accommodating press-molds 71, two loading mechanisms (not shown), two squeezing mechanisms 72 associated with driving supporting multi-end elements 73 of the BPAM and a pressing mechanism which comprises press punches 74 and 75 of which the punch 74 is immediately associated with the BPAM driven multi-end element 76 and the punch 75, with driven multi-end element 77 via tie-rods 78. The driving supporting multi-end elements 73 and the driven multi-end elements 76 and 77 of the BPAM are arranged in the framework guide-ways (not shown). For fear that comprehension of the axoid press construction arrangement be too difficult, the BPAM drive is not shown.

The axoid press version shown in FIG. 10 comprises a cylinder-shaped rotor 79 accommodating press-molds 80, press punches 81, 82, tie-rods 83, a squeezer punch 84 and the BPAM which comprises at least two power circuits thereof with common driving multi-end elements 85 which having support surfaces 86 in aggregate with intermediate members 87, retainer elements 88 and driven multi-end elements 89 provided with support surfaces 90, constitute a powered drive of the press punches 81, and via tie-rods 83, impart drive to the press punch 82. The common driving supporting elements 85 having support surfaces 91, in conjunction with intermediate members 92, retainer elements 93 and driven multi-end elements 94 provided with support surfaces 95 constitute a powered drive of the squeezer punches 84. It is in a similar way that powered drives for other press operating members may be constituted by the respective groups of the support surfaces, intermediate members and driven multi-end elements.

To press-mold intricately shaped articles from a compactible material, e.g., hollow brick the pressing mechanism of the axoid presses shown in FIGS. 8, 9 and 10 may be furnished with punches (FIG. 11) comprising pressure plates 96 and pins 97, said pressure plates are driven by a BPAM 98 as shown, e.g., in FIG. 2, from the drive holder 99 the pins 97, said holder being a driving multi-end element thereof, and a supporting multi-end element 100 can be an element of the press frame. On the other hand, the drive of said device is also the BPAM embodiment of FIG. 3b.

For the sake of better clarity the configuration of the axoid press of FIG. 12 is presented similar to classical configuration of presses. The press comprises a frame composed of a top plate 101, a base plate 102 and columns 103, a press ram 104 serving as a BPAM driven multi-end element provided with support surfaces 105. A supporting multi-end element 106 is held in position to the top plate 101 and has support surfaces 107. Support surfaces 108 are in fact the intermediate multi-end elements of the BPAM shown in FIG. 3b. Intermediate members 109 are held in place by retainer elements 110 while interacting with the support surfaces 105, 107 and 108. Intermediate members 111 are held in place by retainer elements 114 while interacting support surfaces 112 of a driving multi-end element 113 and by the intermediate multi-end elements 108.

The driving multi-end element 113 adapted to reciprocate along guide-ways 115, is the component part of a drive configured as a crank-and-rod mechanism comprising a shaft 116 with a crank 117, and a connecting rod 118. It is quite evident that friction may yet occur in said crank-and-rod mechanism but with the values of normal components of reaction forces in respective guide-ways and articulated joints much more lower than those effective in the BPAM, whereby a harmful effect of friction in such a press is considerably reduced compared with presses equipped with traditional drives.

Operation of a BPAM provided with two power circuits the diagram of which is present in FIG. 1, can be considered separately for each of said power circuits.

With the driving multi-end element 1 moving along the guide-way 15 upwards from the initial position, the motion and force from said element are imparted, by virtue of the support surfaces 2, 4 and the intermediate members 10 rolling in an axoid manner on one another, to the intermediate multi-end elements 3 which are set in linear motion away from each other. As a result, the support surfaces 4, wile rolling in an axoid manner and interacting with the support surfaces 6 and 8 via the intermediate members 12 and 14, impart forces to the intermediate supporting multi-end element 5 and the driven 26 7, with the result that the latter element moves downwards along the guide-way 26 until the geometric axes of the support surfaces 4, 6, 8 and of the intermediate members 12 and 14 get vertically coplanar. Parameters of all support surfaces of the first power circuit may be so chosen that said position is assumed when the geometric axes of the support surfaces 2, 4 and of the intermediate members 10 be horizontally coplanar. Such a choice of the parameters of said support surfaces makes it possible to provide a maximum ratio between the force impressed on the intermediate supporting multi-end element 5 and the applied to the driving multi-end element 1. Should any interference occur tending to distort the motion path of the intermediate supporting multi-end element 5, provision may be made for the guide-ways 25 as an additional means for maintaining said linear motion of the element 5.

Operation of the second power circuit is in many aspects associated with operation of the BPAM first power circuit, because motion of the intermediate supporting multi-end element 5 is completely imparted to the second power circuit.

With the driving multi-end elements 17 receiving synchronous motion towards each other from any heretofore known kind of drive, forces from said elements 17 are imparted to the supporting multi-end element 5 which moves downwards along the guide-ways 25 by virtue of axoid rolling on one another performed by the support surfaces 16, 18, 20 and intermediate members 22 and 24 until the geometric axes of the support surfaces 16, 18, 20 and of the intermediate members 22 and 24 get in the respective vertical planes. On further approaching of the driving multi-end elements 17 the driven multi-end element 19 starts moving downwards. The guide-ways 26 similar to the guide-way 25 serves as an additional means for maintaining linear motion path of the element 5.

The first and second power circuits may receive drive either from separate sources of motion or from a the same (common) source imparting motion to the various driving multi-end elements in any sequence. For instance, the amount of the working stroke performed by the driven multi-end element 7 of the first power circuit may correspond to the amount of permanent set of the material under processing resulting from a force impressed by said power circuit, and the amount of a total stroke of the intermediate supporting multi-end element of the second power circuit may be equal to a few working strokes of the multi-end element 7. In this case, a necessary motion and locking the position assumed by the intermediate supporting multi-end element 5 are performed by the drive of the power circuit in the course of idle stroke of the first power circuit, that is, while returning the driven multi-end element 7 to the initial position.

The BPAM shown in FIG. 2 operates as follows.

With the driving multi-end elements 29, 29a moving in synchronism with each other from the drive inside the supporting end element 27, the motions an forces from said elements 29, 28a are imparted to the driven multi-end elements 32 and 32a by virtue of axoid rolling of the support surfaces 31, 31a and 28, 28a via the intermediate members 35, 35a, and of the support surfaces 30, 30a and 33, 33a via the intermediate members 37, 37a. The driven multi-end elements 32, 32a perform linear translation motion along a motion path provided by the degrees of freedom possessed by the power circuit. The power circuits may operate in synchronism, e.g., when the BPAM is used in a double-action press, wherein the driven multi-end elements 32 and 32a move towards each other in synchronism. A reverse of the driving multi-end elements 29 and 29a results in the reverse of the driven multi-end elements 32 and 32a. The power circuits under consideration may receive drive also asynchronously as shown in FIG. 1.

The BPAM symmetrical with respect to the plane X-X as shown in FIG. 3, operates as follows.

With the driving multi-end elements 38 moving downwards along the guide-ways 53 being actuated by any heretofore known drive, the support surfaces 39, while rolling in an axoid manner on the intermediate members 47 cause synchronous motions of the intermediate multi-end elements 40 away from each other. As a result, the support surfaces 41 perform axoid rolling on the intermediate members 49 and 50 to cause the driven multi-end elements 42 and 44 to move away from each other. According to a version with both movable driven multi-end elements (FIG. 3a), the intermediate supporting multi-end elements 40 move along the guide-ways 52, the driven multi-end element 42 moves upwards, and the driven multi-end element 44 moves downwards synchronously. According a version with a single stationary-fixed driven multi-end element (FIG. 3b), the intermediate multi-end elements 40 moves along arc-shaped motion paths having axes coinciding with the geometric axes of the support surfaces 43, and the driven multi-end element 44 moves downwards when the driven multi-end element 42 fixed stationary and serving as the supporting multi-end element.

In the BPAM units devoid of intermediate multi-end elements (FIG. 4, 5, 6, 7) when the driving multi-end elements 54 moving in synchronism from the initial position towards each other (for the version of FIG. 4) or away from each other (for the version of FIG. 5), the intermediate members 59, performing axoid rolling on the support surfaces 56 and 57, impart motion and forces from the driving multi-end elements 54 to the driven multi-end elements 55 which move away from each other in synchronism relative to the axis of symmetry Y-Y. In this case, as the BPAM approaches the position where the geometric axes of the support surfaces 56 of the driving elements 54 are in the planes passing through the geometric axes of the support surfaces 57 of the driven multi-end elements 55 (hereinafter referred to as "dead point"), the ratio between the forces applied to the driven multi-end elements and the forces applied to the driving multi-end elements increases, and the motion speed decreases. Magnitudes of forces applied to the driven multi-end elements depend on opposition offered to their motion, and those of forces applied to the driving multi-end elements depend on the force applied to the driven multi-end elements and on the ratio between the forces applied to the driven multi-end elements and the forces applied to the driving multi-end elements. According to the versions of FIGS. 4 and 5, the driving multi-end elements 54 stops moving from the drive at the instant when the "dead end" position is reached or, whenever necessary, after a certain comparatively small distance after passing the "dead point" position; according to the version, wherein the movement area of geometric axes of the support surfaces of the driving multi-end elements is located on both sides of the planes passing through the geometric axes of the support surfaces of the driven multi-end elements, motion of the driving multi-end elements 54 continues until a second extreme position is reached, whereby motion of the driven multi-end elements reverses its direction.

During a reverse motion of the driving multi-end elements, if said motion starts behind the "dead point", the driven multi-end elements 55 which has gone somewhat backwards from the extreme position, reach said position one more again, which is quite desirable for certain technological processes, and keep moving towards their initial position not until the BPAM passes the "dead point" position, said initial position being reached upon returning the driving multi-end elements 54 to the initial position.

The press-molding process in the axoid press shown in FIG. 8 occurs as follows. The drive (not shown) imparts motion to the driving multi-end elements 68 of the BPAM to cause them to move towards each other in synchronism along the guide-ways of the press frame 69, thereby setting the driven multi-end elements 65 and 66 in symmetrical motion with respect to the frame 69, so that the driven multi-end element 65 causes the top punch 64 to move downwards and the driven multi-end element 66 causes the bottom punch 64 to move through the tie-rods 67. Maximum mutual approach of the punches 64 and maximum force that may be overcome by the drive is attained at the instant when the geometric axes of the support surfaces of the driving multi-end elements 68 and the driven multi-end elements 65 and 66 of the BPAM are disposed in two parallel planes (that is, at the "dead point"). Should the drive be so adjusted that the BPAM comes somewhat beyond the "dead point", this results in that the punches 64 moves somewhat away from each other, thus simplifying air removal from the moldable mix to ensure against delamination of the article being molded due to the pressure of the air remaining therein; then the punches approach each other once more again during return stroke of the driving multi-end elements 68 while passing the "dead point" in order to move away from each other and assume the initial position. Thus, a twofold molding of the article occurs, which contributes to higher-quality molding process.

Once the driving multi-end elements 73 in the axoid press shown in FIG. 9 have been imparted, from the drive, a symmetric motion away from each other, the driven multi-end elements 76 and 77 also move away from each other symmetrically, each of which causes one punch 74 to move away from the center, and through the tie-rods 78 it causes one punch 75 to move towards the center, thereby providing double-action press-molding of the article in two press-molds 71. Insofar as each of the driven multi-end elements 76 and 77 actuates one punch in each of the press -molds wherein two articles are being press-molded at a time, said driven multi-end elements 76 and 77 are loaded equally even when forces of resistance offered in different molds are dissimilar, thus contributing to lesser reaction forces applied to the guide-ways and accordingly to lower friction therein.

When the common driving multi-end elements 85 in the axoid press of the version of FIG. 10 move symmetrically, the motion and forces thereof are imparted symmetrically to two driven the applicants 89 associated with the press punches 81 and, via the tie-rods 83, with the press punches 82 which perform double-action pressing; the motion and forces are symmetrically imparted, via the support surfaces 91, 95 and the intermediate members 92, to the driven multi-end elements 94 associated with the squeezer punches 84 to press off the finished articles.

Thus the motions and forces may similarly be imparted by the common driving multi-end elements 85 to other driven multi-end elements (not shown) associated with other operating members of the press. According to said version, there is provided not only the drive from a single BPAM but also high degree of synchronism of operation of the press operating members.

The press punch of any one of the axoid presses shown in FIGS. 8, 9, 10 and comprising a pressing plate and pins operates as follows.

With the pins 97 and pin holders 99 performing the pressing motion imparted by the pressing drive, motion from the pin holders 99 mechanically associated with the driving multi-end elements is imparted to the BPAM 98 whose driven multi-end elements are connected to the pressing plates 96 which are movable for pressing and press-mold locking in the final position; in the case, with the BPAM units close to the "dead point" the amount of travel of the pressing plates 96 is very small, while that of the pins 97 are substantial. On that account, final molding of an article is performed by the pins 97 checkered on both sides, thereby enabling one to attain more even distribution of compacting forces over the volume of the article and a uniform strength thereof, whereas the pressing plates 96 hold the press-mold locked. In this case, the supporting multi-end element 100 equalizes the reaction forces of both power circuits of the BPAM 98.

The axoid press shown in FIG. 12 operates as follows.

The motion developed by press drive (cf. RefNos 116-118) is converted into reciprocation of the driving multi-end element appearing as the slide 113 wherefrom motion and forces are imparted, via the support surfaces 112 performing axoid rolling on the intermediate members 11, to the intermediate multi-end elements 108 and further on to the driven multi-end element appearing as the vertically reciprocating slide 104, thereby rendering technological action on the article (not shown), the bottommost position of the slide 104 corresponding to the "dead point" of the BPAM.

Hence, the present invention enables one to use for the most loaded elements, i.e., supporting surfaces, the materials that need not high antifriction properties due to their being fee from friction bot possessing high hardness, such as ball-bearing steels lending contact stresses up to 350 kgf/mm$^2$ [1] in the case of a line contact. This in turn make it possible to increase their power characteristics many fold (up to six times and over) as compared to equal-sized articulation linkage mechanisms, to considerably reduce waste of energy and wear on the equipment due to lower friction, to substantially simplify problems of lubrication and cooling, and to contribute to better solving the problems of mechanization and automation of production equipment.

The invention claimed is:

1. A balanced power axoid mechanism comprising power axoid mechanisms having end and intermediate elements provided with support surfaces so constructed and arranged that while one of the end elements is moving there is provided their slideless mutual rolling and imparting the motion and forces therefrom to another end element, CHARACTERIZED in that it is essentially a system of power members each of which comprising at least one power axoid mechanism, and all the end elements are integrated into the driving and driven multi-end elements which in turn integrate the power members into at least one power circuit that balances the forces of said elements.

2. The balanced power axoid mechanism as defined in claim 1, CHARACTERIZED in that it comprises at least one supporting multi-end element accommodating thereinside the driving, driven and whenever necessary, intermediate and supporting multi-end elements which lock up the power members into one or more power circuits that balance the forces thereof.

3. The balanced power axoid mechanism as defined in claim 1, CHARACTERIZED in that it is configured symmetrical with respect to at least one plane with a possibility for any multi-end elements thereof to move symmetrically to said plane.

4. The balanced power axoid mechanism as defined in claim 1, CHARACTERIZED in that the area of movement of the geometric axes of the support surfaces of the driving multi-end elements of at least one power circuit thereof is located off the zone defined by the parallel planes passing through the geometric axes of the support surfaces of its driven multi-end elements.

5. The balanced power axoid mechanism as defined in claim 1, CHARACTERIZED in that the area of movement of the geometric axes of the support surfaces of the driving multi-end elements of at least one power circuit thereof is located between the parallel planes passing through the geometric axes of the supporting surfaces of its driven multi-end elements.

6. The balanced power axoid mechanism as defined in claim 1, CHARACTERIZED in that the area of movement of the geometric axes of the support surfaces of the driving multi-end elements of at least one of the power circuit thereof is spread on both sides of the respective parallel planes passing through the geometric axes of the support surfaces of its driven multi-end elements.

7. An axoid power mechanism comprising a frame, power mechanism and other operating members and drives thereof, CHARACTERIZED in that it further comprise at least one balanced power axoid mechanism as defined in claim 1.

8. The axoid power mechanism as defined in claim 7, CHARACTERIZED in that the drive of the power mechanism and of at least one of the remainder operating members thereof is configured as one balanced power axoid mechanism having two driving multi-end elements.

9. The axoid power mechanism as defined in claim 7, CHARACTERIZED in that the power mechanism thereof comprises at least two punches and is capable of performing double-action press-molding procedure.

10. The axoid power mechanism as defined in claim 7, CHARACTERIZED in that at least one punch of the power mechanism comprises the pins and the pressing plate whose motions relative to each other and to the press frame are provided by at least one power axoid mechanism having end and intermediate elements provided with support surfaces so constructed and arranged that while one of the end elements is moving there is provided their slideless mutual rolling and imparting the motion and forces therefrom to another end element, CHARACTERIZED in that it is essentially a system of power members each of which comprising at least one power axoid mechanism, and all the end elements are integrated into the driving and driven multi-end elements which in turn integrate the power members into at least one power circuit that balances the forces of said elements.

* * * * *